(12) United States Patent
Jiang (10) Patent No.: US 11,240,210 B2
(45) Date of Patent: Feb. 1, 2022

(54) METHODS, APPARATUSES, AND SYSTEMS FOR ACQUIRING LOCAL INFORMATION

(71) Applicant: Advanced New Technologies, Co., Ltd., Grand Cayman (KY)

(72) Inventor: Chunhua Jiang, Hangzhou (CN)

(73) Assignee: Advanced New Technologies Co., Ltd., Grand Cayman (KY)

(*) Notice: Subject to any disclaimer, the term of this patent is extended or adjusted under 35 U.S.C. 154(b) by 84 days.

(21) Appl. No.: 15/325,588

(22) PCT Filed: Jun. 17, 2015

(86) PCT No.: PCT/CN2015/081678
§ 371 (c)(1),
(2) Date: Jan. 11, 2017

(87) PCT Pub. No.: WO2016/008349
PCT Pub. Date: Jan. 21, 2016

(65) Prior Publication Data
US 2017/0163610 A1 Jun. 8, 2017

(30) Foreign Application Priority Data
Jul. 17, 2014 (CN) .......................... 201410342583.6

(51) Int. Cl.
*G06F 21/00* (2013.01)
*H04L 29/06* (2006.01)
(Continued)

(52) U.S. Cl.
CPC ........ *H04L 63/0428* (2013.01); *G06F 16/957* (2019.01); *G06Q 20/382* (2013.01);
(Continued)

(58) Field of Classification Search
CPC ... H04L 63/0428; H04L 63/04; H04L 9/0869; H04L 41/0253; H04L 63/0823
See application file for complete search history.

(56) References Cited

U.S. PATENT DOCUMENTS 7,752,448 B1   7/2010  Badenell
8,688,976 B2 * 4/2014  Busser .................... G06F 21/57
                                                    380/278

(Continued)

FOREIGN PATENT DOCUMENTS

CN       1556449 A    12/2004
CN       1784673      6/2006

(Continued)

OTHER PUBLICATIONS

Extended European Search Report pursuant to Rule 62 EPC, the supplementary European search report (Art. 153(7) EPC) and the European search opinion related to Application No. 15822323.0-1862 / 3171543, dated May 17, 2017 (10 pgs.).

(Continued)

*Primary Examiner* — Kendall Dolly
*Assistant Examiner* — Michael M Lee
(74) *Attorney, Agent, or Firm* — Finnegan, Henderson, Farabow, Garrett & Dunner, LLP (57) ABSTRACT

The present application discloses methods, apparatuses, and systems for acquiring local information. An exemplary method may include sending a first request for information acquisition to a network apparatus through a script in a browser. The method may also include monitoring, through the local application tool, a random number, sent by the network apparatus, corresponding to the first request for information acquisition. Moreover, the method may include acquiring, through the local application tool, the first request for information acquisition corresponding to the random number stored in the network apparatus. Furthermore, the
(Continued)

method may include acquiring, through the local application tool, local information corresponding to the first request for information acquisition, and sending, through the local application tool, the local information to the network apparatus.

15 Claims, 6 Drawing Sheets (51) Int. Cl.
G06F 16/957 (2019.01)
H04L 12/24 (2006.01)
G06Q 20/38 (2012.01)
G06Q 20/40 (2012.01)
H04L 9/08 (2006.01)
H04L 29/08 (2006.01)

(52) U.S. Cl.
CPC ......... *G06Q 20/401* (2013.01); *H04L 9/0869* (2013.01); *H04L 41/0253* (2013.01); *H04L 67/10* (2013.01); *H04L 63/0823* (2013.01)

(56) References Cited

U.S. PATENT DOCUMENTS

| | | | |
|---|---|---|---|
| 9,628,461 B2* | 4/2017 | Li | H04L 9/3263 |
| 2001/0045451 A1 | 11/2001 | Tan et al. | |
| 2006/0173981 A1* | 8/2006 | Zhang | H04L 41/0253 |
| | | | 709/223 |
| 2006/0179003 A1* | 8/2006 | Steele | G06Q 20/382 |
| | | | 705/59 |
| 2007/0300292 A1 | 12/2007 | Scipioni et al. | |
| 2008/0077796 A1* | 3/2008 | Lund | H04L 63/0823 |
| | | | 713/173 |
| 2008/0134311 A1* | 6/2008 | Medvinsky | G06F 21/33 |
| | | | 726/7 |
| 2008/0281969 A1 | 11/2008 | Horton et al. | |
| 2010/0049984 A1* | 2/2010 | Masushio | H04L 9/0861 |
| | | | 713/179 |
| 2010/0091993 A1* | 4/2010 | Iwama | H04W 12/04 |
| | | | 380/273 |
| 2010/0211790 A1* | 8/2010 | Zhang | H04L 9/321 |
| | | | 713/171 |
| 2011/0047373 A1* | 2/2011 | Karasawa | G06F 21/33 |
| | | | 713/156 |
| 2012/0054492 A1* | 3/2012 | Kim | H04L 9/083 |
| | | | 713/168 |
| 2014/0165174 A1 | 6/2014 | Scipioni et al. | |
| 2014/0289510 A1* | 9/2014 | Tuch | H04L 63/102 |
| | | | 713/156 |
| 2015/0271245 A1* | 9/2015 | Xu | G06F 17/30914 |
| | | | 709/203 |
| 2016/0226827 A1* | 8/2016 | Bohannon | H04L 63/0281 |
| 2016/0373418 A1* | 12/2016 | Stahl | G06F 21/33 |
| 2017/0338964 A1* | 11/2017 | O'Regan | H04L 63/061 |

FOREIGN PATENT DOCUMENTS

| | | |
|---|---|---|
| CN | 1787513 A | 6/2006 |
| CN | 101541002 A | 9/2009 |
| CN | 101610157 A | 12/2009 |
| CN | 101799821 A | 8/2010 |
| CN | 102118504 A | 7/2011 |
| CN | 102819451 A | 12/2012 |
| CN | 103067398 | 4/2013 |
| CN | 103179159 A | 6/2013 |
| CN | 103581145 A | 2/2014 |
| EP | 2860906 A1 | 4/2015 |
| JP | H11184818 A | 7/1999 |
| JP | 2006520501 A | 9/2006 |
| WO | WO 2014/000281 A1 | 1/2014 |
| WO | WO 2014/094240 A1 | 6/2014 |

OTHER PUBLICATIONS

PCT International Search Report dated Apr. 4, 2013, issued in corresponding International Application No. PCT/CN2012/077939 (4 pgs.).

PCT International Search Report dated Sep. 19, 2013, issued in corresponding International Application No. PCT/CN2012/086857 (6 pgs.).

PCT International Search Report dated Sep. 23, 2015, issued in corresponding International Application No. PCT/CN2015/081678 (8 pages).

Japanese Office Action issued in corresponding Japanese Application No. 2017-501640, dated Feb. 25, 2019, 5 pgs.

PCT Written Opinion dated Sep. 23, 2015, issued in corresponding International Application No. PCT/CN2015/081678 (8 pages).

First Search Report Issued by the State Intellectual Property Office of People's Republic of China in corresponding Chinese Application No. 2014103425836, dated Dec. 14, 2017 (1 page).

* cited by examiner

METHODS, APPARATUSES, AND SYSTEMS FOR ACQUIRING LOCAL INFORMATION

CROSS REFERENCE TO RELATED APPLICATION

This application is the U.S. national stage application under 35 U.S.C. § 371 of International Application No. PCT/CN2015/081678, filed on Jun. 17, 2015, which claims priority to and the benefits of priority to Chinese Application No. 201410342583.6, filed Jul. 17, 2014, both of which are incorporated herein by reference in their entireties.

TECHNICAL FIELD

The present application relates to the technical field of computers, and more particularly, to methods, apparatuses, and systems for acquiring local information.

BACKGROUND

Web applications are application programs where a user interface resides in a browser, such as online Web applications including online banking or online payment.

When some Web applications are used, a network apparatus needs to acquire local information of a terminal. For example, when a user performs online banking or online payment related operations through a terminal, a network apparatus needs to acquire local information of the terminal to ensure information security before completing the whole operation process. Taking online payment as an example, when a user logs in to the Alipay page, a terminal may acquire local information of the terminal through a script in a browser. The terminal may further submit the local information to a network apparatus. The local information may be a verification result of a local digital certificate for verifying reliability of the terminal.

However, for information security, a browser cannot directly acquire local information of a terminal where the browser is located. Therefore, in the prior art, local information is generally acquired through a browser plug-in technology. Specifically, in the above example of online payment, the user needs to locally pre-install a plug-in for verifying a digital certificate as prompted by the browser. Then, the terminal directly invokes the plug-in through the script in the browser, acquires a verification result of the digital certificate through the plug-in, and finally submits the verification result to the network apparatus.

However, the acquisition of the local information using the browser plug-in technology has the following defects. Firstly, the problem of compatibility exists between a browser and a plug-in. When a browser currently acquiring local information is not well compatible or completely incompatible with the corresponding plug-in installed locally, this situation may easily cause failure of the acquisition of local information on a webpage. It may even lead to breakdown of the browser and cause unstable usage of the browser. In addition, browsers of different types or different versions of browsers of the same type may correspond to different plug-in technologies (for example, plug-ins interacting with different browsers through different interfaces). Therefore, a website may need to be adapted to different browser plug-in technologies, which greatly increases the difficulty in website maintenance.

SUMMARY

Embodiments of the present application provide methods and apparatuses for acquiring local information to solve the problems of browser instability and difficulty in website maintenance due to the acquisition of local information by using a browser plug-in technology in the prior art.

To achieve the above objective, in one aspect, the present disclosure is directed to a method for acquiring local information. The method may include sending a first request for information acquisition to a network apparatus through a script in a browser. The first request for information acquisition may be used for instructing a local application tool to acquire local information. The method may also include monitoring, through the local application tool, a random number, sent by the network apparatus, corresponding to the first request for information acquisition. The method may further include acquiring, through the local application tool, the first request for information acquisition corresponding to the random number stored in the network apparatus. The correspondence between the random number and the first request for information acquisition may be established and stored by the network apparatus. In addition, the method may include acquiring, through the local application tool, local information corresponding to the first request for information acquisition, and sending, through the local application tool, the local information to the network apparatus.

In another aspect, the present disclosure is directed to another method for acquiring local information. The method may include receiving a first request for information acquisition sent by a terminal through a script in a browser. The first request for information acquisition may be used for instructing a local application tool of the terminal to acquire local information. The method may also include determining and storing a random number corresponding to the first request for information acquisition. The method may further include sending the random number to the terminal. In addition, the method may include receiving a second request for information acquisition sent by the terminal through the local application tool. Moreover, the method may also include sending, to the terminal, the first request for information acquisition corresponding to the random number carried in the second request for information acquisition. Furthermore, the method may include receiving local information corresponding to the received first request for information acquisition and acquired by the terminal through the local application tool.

In a further aspect, the present disclosure is directed to an apparatus for acquiring local information. The apparatus may include a first-request-for-information-acquisition sending module sending a first request for information acquisition to a network apparatus through a script in a browser. The first request for information acquisition being used for instructing a local application tool to acquire local information. The apparatus may also include a random-number monitoring module monitoring, through the local application tool, a random number corresponding to the first request for information acquisition sent by the network apparatus. The apparatus may further include a first-request-for-information-acquisition acquiring module acquiring, through the local application tool, the first request for information acquisition corresponding to the random number stored in the network apparatus. The correspondence between the random number and the first request for information acquisition may be established and stored by the network apparatus. In addition, the apparatus may include a local-information acquiring module acquiring, through the local application tool, local information corresponding to the first request for information acquisition. Moreover, the apparatus may include a local-information sending module sending the local information to the network apparatus through the local application tool.

In another further aspect, the present disclosure is directed to another apparatus for acquiring local information. The apparatus may include a first-request-for-information-acquisition receiving module receiving a first request for information acquisition sent by a terminal through a script in a browser. The first request for information acquisition may be used for instructing a local application tool of the terminal to acquire local information. The apparatus may also include a random-number determining module determining a random number corresponding to the first request for information acquisition. The apparatus may further include a random-number sending module sending the random number to the terminal. In addition, the apparatus may include a storage module storing the random number corresponding to the first request for information acquisition. Moreover, the apparatus may include a second-request-for-information-acquisition receiving module receiving a second request for information acquisition sent by the terminal through the local application tool. Furthermore, the apparatus may include a first-request-for-information-acquisition sending module sending, to the terminal, the first request for information acquisition corresponding to the random number carried in the second request for information acquisition. Furthermore, the apparatus may include a local-information receiving module receiving local information, acquired by the terminal through the local application tool, corresponding to the received first request for information acquisition.

In another further aspect, the present disclosure is directed to a system for acquiring local information. The system may include a terminal and a network apparatus. The terminal may be configured to send a first request for information acquisition to a network apparatus through a script in a browser. The first request for information acquisition may be used for instructing a local application tool to acquire local information. The terminal may also be configured to monitor, through the local application tool, a random number, sent by the network apparatus, corresponding to the first request for information acquisition. The terminal may further be configured to acquire, through the local application tool, the first request for information acquisition corresponding to the random number stored in the network apparatus. Moreover, the terminal may be configured to acquire, through the local application tool, local information corresponding to the first request for information acquisition, and send, through the local application tool, the local information to the network apparatus. The network apparatus may be configured to receive the first request for information acquisition sent by the terminal. The network apparatus may also be configured to determine and store the random number corresponding to the first request for information acquisition. The network apparatus may further be configured to send the random number to the terminal. In addition, the network apparatus may be configured to receive a second request for information acquisition sent by the terminal through the local application tool. Moreover, the network apparatus may be configured to send, to the terminal, the first request for information acquisition corresponding to the random number carried in the second request for information acquisition. Furthermore, the network apparatus may be configured to receive the local information sent by the terminal.

In the present disclosure, the local application tool of the terminal is configured to monitor the random number, sent by the network apparatus, that corresponds to the first request for information acquisition received by the network apparatus. The local application tool of the terminal is also configured to acquire the first request for information acquisition, stored in the network apparatus, corresponding to the random number. The local application tool of the terminal is further configured to acquire the local information corresponding to the first request for information acquisition, and send the local information to the network apparatus for other apparatuses to acquire and use. Because no interface is needed for information exchange between the local application tool and the browser, the problem of compatibility may not exist between the browser and the local application tool. The problem of browser instability due to compatibility during the acquisition of local information by using a browser plug-in technology may be effectively avoided. The difficulty in website maintenance may be effectively reduced.

BRIEF DESCRIPTION OF THE DRAWINGS

The drawings are described herein for further understanding of the present application. These drawings are part of the present application. The exemplary embodiments of the present application and the descriptions thereof are for illustrating, but not limiting the present application.

DETAILED DESCRIPTION

In the embodiments of the present application, taking information security into consideration, a browser of a terminal may not directly acquire local information of the terminal where the browser is located. If the browser directly invokes a plug-in to acquire the local information, the browser and the plug-in are required to have high compatibility. Therefore, on the premise that the browser does not directly acquire the local information, in the present application, the terminal may be configured to send an acquisition request for acquiring local information to a network apparatus through a script in the browser. The terminal may also be configured to acquire the acquisition request from the network apparatus through a local application tool. The terminal may further be configured to acquire corresponding local information according to the acquisition request. In addition, the terminal may be configured to provide the local information to the network apparatus. In this way, the browser does not necessarily need to directly acquire the local information, which ensures information security. The browser does not necessarily need to directly interact with the local application tool and thus does not need to be compatible with the local application tool. It may effectively avoid the problem of browser instability caused by incompatibility between the browser and the plug-in. It may also effectively avoid the problem of difficulty in website maintenance.

To make the objectives, technical solutions, and advantages of the present application clear, the technical solutions of the present application are described clearly and completely with reference to the specific embodiments of the present application and the accompanying drawings. Apparently, the described embodiments are merely some of, rather than all, the embodiments of the present application. Based on the embodiments of the present application, all other embodiments derived by persons of ordinary skill in the art without any creative efforts shall fall within the protection scope of the present application.

An exemplary method for acquiring local information, according to an embodiment of the present application, is illustrated below from the aspect of a terminal.

Figure 1:
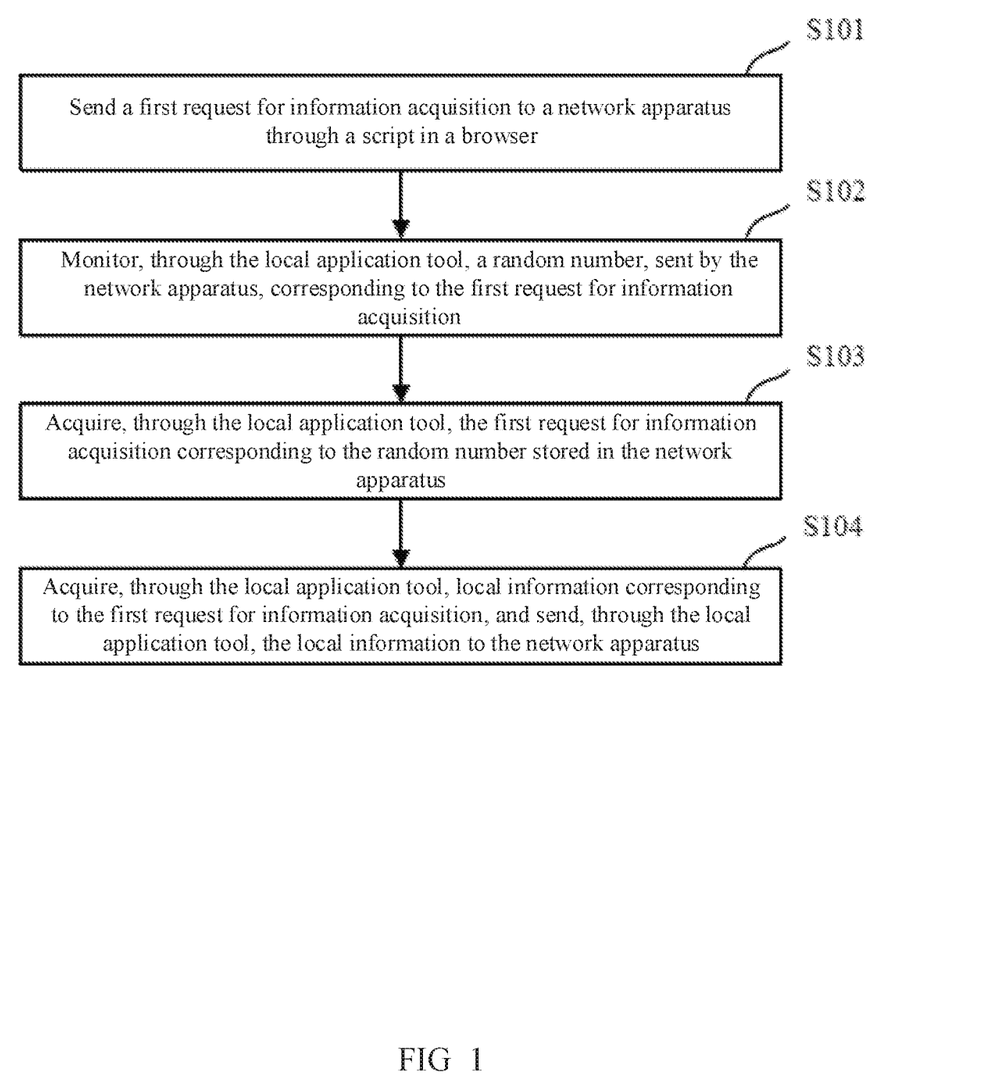
FIG. 1 is a schematic flow chart of an exemplary method for acquiring local information, according to an embodiment of the present application.

FIG. 1 is a schematic flow chart of an exemplary method for acquiring local information, according to an embodiment of the present application. The method may include:

S101: Send a first request for information acquisition to a network apparatus through a script in a browser. The first request for information acquisition may be used for instructing a local application tool to acquire local information.

The script in the embodiment of the present application is a script that can be parsed and run by a browser. Specifically, the script includes, but is not limited to, a JavaScript script, or a JS script for short.

Different Web applications may require a terminal to provide different local information. The local information in the present application includes, but is not limited to, a verification result of a digital certificate of a local user, identifier information of a local device, information of a system application program interface (for example, information of a system application (App) interface), and information of a local file system.

A payment application is described below as an example of a Web application. It is assumed that a user intends to log in to the page of the payment application. A server (that is, a network apparatus) of the payment application requires the terminal to provide a verification result of a local digital certificate of the terminal (the verification result is the local information).

The local application tool may be an executable program that can verify the local digital certificate and provide a verification result. The executable program may be stored in a storage medium of the terminal (for example, a hard disk of the terminal), or stored in an external storage medium connected to the terminal (for example, a removable hard disk connected to the terminal).

It should be noted that, the step that the terminal sends the first request for information acquisition to the network apparatus through the script in the browser may be triggered by a step that the terminal sends a service request to the network apparatus. In some embodiments, the first request for information acquisition and the service request may be sent at the same time (for example, the first request for information acquisition and the service request are integrated into a request message which is sent to the network apparatus).

Specifically, in the above example, when the user logs in to the page of the payment application, the terminal needs to send a login request (the login request is a service request) to a server of the payment application through the browser. Therefore, the browser triggers the step of sending the first request for information acquisition to the server through a JS script. The first request for information acquisition is used for instructing the local application tool of the terminal to acquire the verification result of the local digital certificate of the terminal.

The JS script may be sent to the browser and installed in the browser after the server receives the login request. In some embodiments, the JS script may be pre-configured in the browser.

S102: Monitor, through the local application tool, a random number, sent by the network apparatus, corresponding to the first request for information acquisition.

The random number in the embodiment of the present application is a random number in plain text. In other words, the random number is an unencrypted random number. Therefore, the local application tool can directly read the random number after monitoring the random number.

After receiving the first request for information acquisition sent by the terminal, the network apparatus may generate a random number as the random number corresponding to the first request for information acquisition, and send the random number to the terminal. When the terminal receives the random number, the local application tool in the terminal may monitor the random number sent by the network apparatus. The network apparatus stores the correspondence between the generated random number and the first request for information acquisition.

Furthermore, in an actual application scenario, the terminal exchanges information with the network apparatus based on Hypertext Transfer Protocol Secure (HTTPS), where the HTTPS protocol is a combination of Hypertext Transfer Protocol (HTTP) and Secure Sockets Layer (SSL) protocol. In other words, whenever the terminal sends a request for information acquisition to the network apparatus through the JS script in the browser, the terminal and the network apparatus perform a secure connection process based on the SSL protocol. Only after the execution of the secure connection process is completed, the network apparatus receives the request for information acquisition based on a secure channel established by the secure connection process. In a key agreement process of the secure connection process, the terminal and the network apparatus may respectively generate a random number and provide the random number to each other. The random numbers exchanged between the terminal and the network apparatus in the secure connection process are both random numbers in plain text. Therefore, in the embodiment of the present application, after receiving the first request for information acquisition sent by the terminal through the JS script in the browser, the network apparatus does not need to particularly generate and send a random number according to the first request for information acquisition. Instead, the network apparatus may directly use the random number generated by the network apparatus in the secure connection process. The network apparatus may also establish and store the correspondence between the random number and the subsequently received first request for information acquisition. In the secure connection process, the network apparatus has sent the random number to the terminal. The local application tool of the terminal has monitored the random number. Therefore, the network apparatus does not need to send the random number to the terminal again after establishing and storing the correspondence between the random number generated in the secure connection process and the subsequently received first request for information acquisition. It may avoid the problem of resource waste caused by repeated generation and sending the random number by the network apparatus. The local application tool in the terminal monitors the random number in the secure connection process. It then may periodically send a second request for information acquisition carrying the random number to the network apparatus to acquire the first request for information acquisition corresponding to the random number.

Moreover, if the random number sent by the network apparatus in the secure connection process is used as the random number corresponding to the first request for information acquisition, the local application tool in the terminal may monitor by using an information filtering and replication method when monitoring the random number sent by the network apparatus in the secure connection process. It may avoid affecting the key agreement process. Specifically, when the terminal monitors, through the local application tool, the random number sent by the network apparatus in the key agreement process, an SSL protocol on a driving layer may be pre-set to enable the local application tool to filter the information exchanged between the terminal and the network apparatus on the driving layer, and read the random number sent by the network apparatus in the key agreement process between the terminal and the network apparatus. Accordingly, it may rapidly and effectively acquire the random number sent by the network apparatus. Further, it needs to make sure that the random number monitored by the terminal through the local application tool is uniquely corresponding to the first request for information acquisition. In other words, it needs to make sure that the network apparatus sends a unique random number to the terminal each time, thereby avoiding the problem that the terminal provides inaccurate local information to the network apparatus.

Specifically, in the present application, an algorithm for generating a random number used by the network apparatus in an SSL protocol-based key agreement process may be set to ensure that a unique random number is generated each time. Further, the SSL protocol may be set to disable instructions of a session cache (SSL session cache) and a secure connection (connection keepalive) after the terminal sends the first request for information acquisition to the network apparatus through the script in the browser. It may prevent the random number stored in the session cache from being repeatedly used by the network apparatus in the secure connection process with the terminal, thereby ensuring that the network apparatus sends a unique random number to the terminal.

S103: Acquire, through the local application tool, the first request for information acquisition corresponding to the random number stored in the network apparatus. The correspondence between the random number and the first request for information acquisition may be established and stored by the network apparatus.

The terminal may actively acquire the first request for information acquisition corresponding to the random number stored in the network apparatus. The terminal may also passively acquire the first request for information acquisition corresponding to the random number sent by the network apparatus.

Specifically, the terminal may actively send, through the local application tool, a second request for information acquisition carrying the monitored random number to the network apparatus. The network apparatus may send the first request for information acquisition corresponding to the random number to the terminal according to the random number carried in the second request for information acquisition. Alternatively, the terminal may passively receive, through the local application tool, a response message that carries the first request for information acquisition and the random number provided by the network apparatus. After receiving the response message, the local application tool may verify whether the random number carried in the response message is identical to the random number monitored by the local application tool. If yes, the local information may be acquired through Step S104 described below. If not, the response message may be discarded.

S104: Acquire, through the local application tool, local information corresponding to the first request for information acquisition, and send, through the local application tool, the local information to the network apparatus.

In the above example, the first request for information acquisition is an acquisition request for acquiring the verification result of the local digital certificate. After the local application tool acquires the first request for information acquisition from the network apparatus in Step S103, the local digital certificate is verified according to the first request for information acquisition. In addition, the verification result of the local digital certificate is sent to the network apparatus. Because the step that the terminal sends the first request for information acquisition is triggered when the terminal sends, to the network apparatus, a login request for logging in to the page of the payment application, after receiving the verification result (that is, the local information), the network apparatus may correspondingly process the login request sent by the terminal according to the verification result. In other words, if the verification result is that the verification is successful, the login request of the terminal is accepted. The terminal is allowed to log in to the interface of the payment application. If the verification result is that the verification fails, the login request of the terminal is rejected.

In the method for acquiring local information according to the embodiment of the present application, the terminal does not directly acquire the local information through the script in the browser, but acquires the local information through the local application tool. It ensures the security of HTTPS protocol-based information exchange. In addition, the browser does not directly invoke the local application tool to acquire the local information. Instead, the browser sends the first request for information acquisition to the network apparatus through the script. The local application tool acquires the first request for information acquisition from the network apparatus and acquires the local information according to the first request for information acquisition. Therefore, the local application tool does not need to provide any interface compatible with the browser. The problem of compatibility does not exist between the local application tool and the browser. It may avoid the problem of browser instability due to incompatibility between the browser and a plug-in during the process that the browser directly invokes the plug-in. It may also avoid the difficulty in website maintenance ensuring that browsers of different types or browsers of different versions are compatible with the local application tool.

To ensure that the first request for information acquisition is not intercepted and modified by a third party when the network apparatus provides the first request for information acquisition to the local application tool of the terminal, in the embodiment of the present application, the network apparatus may encrypt the first request for information acquisition before providing the first request for information acquisition to the local application tool of the terminal. The network apparatus may then provide the encrypted first request for information acquisition to the local application tool of the terminal.

Specifically, if the local application tool of the terminal actively acquires the first request for information acquisition according to the monitored random number, the network apparatus may encrypt the first request for information acquisition corresponding to the random number carried in the second request for information acquisition after receiving the second request for information acquisition sent by the local application tool of the terminal. The network apparatus may then send the encrypted first request for information acquisition to the local application tool of the terminal.

Correspondingly, the local application tool of the terminal receives the encrypted first request for information acquisition, decrypts the first request for information acquisition, acquires the local information according to the decrypted first request for information acquisition, and sends the local information to the network apparatus.

Another exemplary method for acquiring local information corresponding to the above embodiment is illustrated below from the aspect of a network apparatus.

Figure 2:
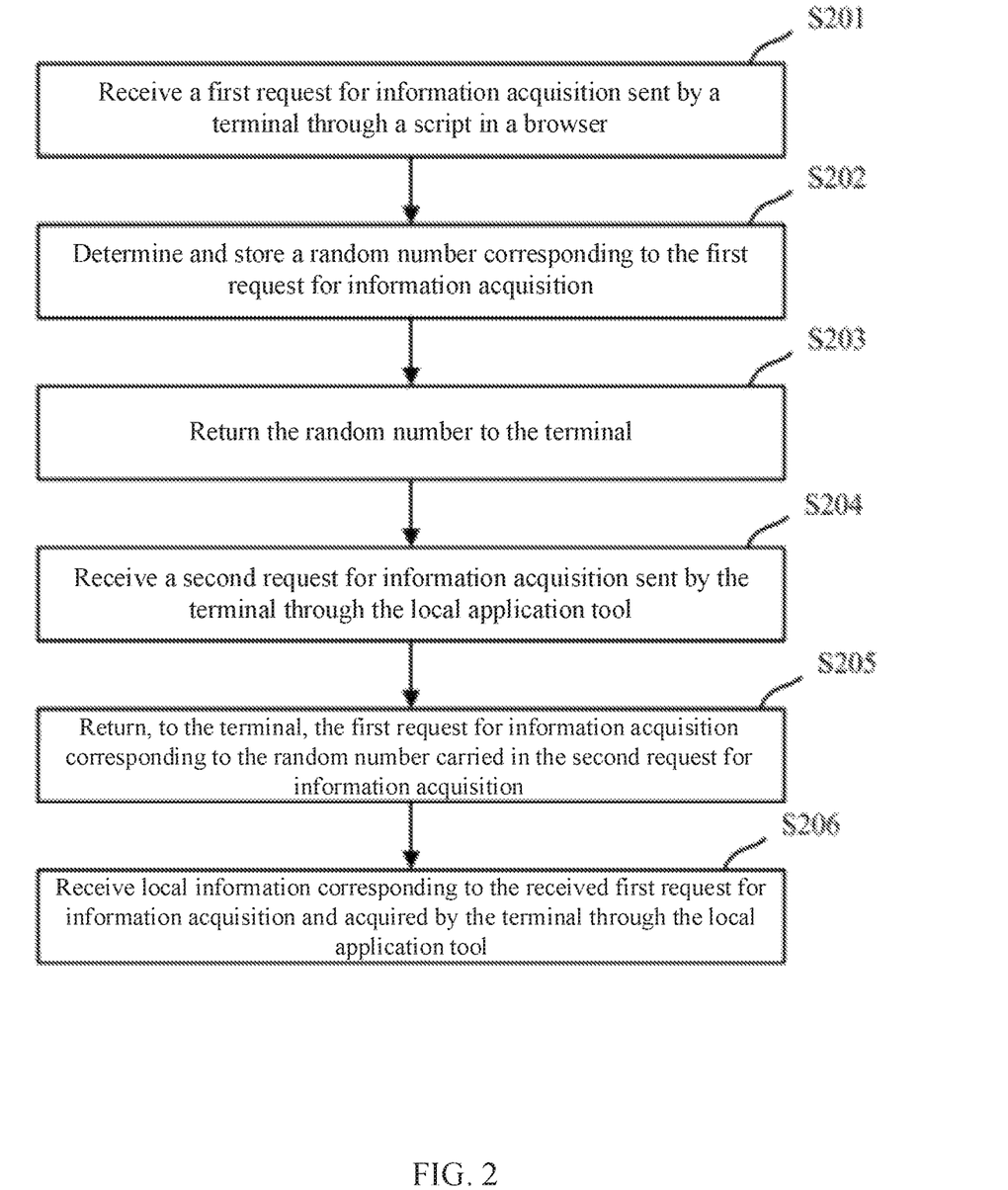
FIG. 2 is another schematic flow chart of an exemplary method for acquiring local information, according to an embodiment of the present application.

FIG. 2 is another schematic flow chart of an exemplary method for acquiring local information, according to an embodiment of the present application. The method may include:

S201: Receive a first request for information acquisition sent by a terminal through a script in a browser. The first request for information acquisition may be used for instructing a local application tool of the terminal to acquire local information.

S202: Determine and store a random number corresponding to the first request for information acquisition.

Specifically, the network apparatus may generate the random number corresponding to the first request for information acquisition when receiving the first request for information acquisition. The network apparatus may also store the correspondence between the first request for information acquisition and the random number. The network apparatus may further directly use the random number generated during the secure connection process with the terminal before receiving the first request for information acquisition, and determine the random number as the random number corresponding to the first request for information acquisition, which will not be described herein again.

S203: Return the random number to the terminal.

After the network apparatus sends the random number corresponding to the first request for information acquisition to the terminal, the local application tool of the terminal monitors the random number, and sends a second request for information acquisition for acquiring the first request for information acquisition to the network apparatus.

It should be noted that, if the network apparatus directly uses the random number generated in the secure connection process as the random number corresponding to the first request for information acquisition, Step 203 may be omitted. In other words, the network apparatus has sent the random number to the terminal in the secure connection process. Therefore, the network apparatus does not need to send the random number again after receiving the first request for information acquisition.

S204: Receive a second request for information acquisition sent by the terminal through the local application tool. The second request for information acquisition may carry the random number monitored by the local application tool.

S205: Return, to the terminal, the first request for information acquisition corresponding to the random number carried in the second request for information acquisition.

The above describes a process where the terminal actively acquires the first request for information acquisition from the network apparatus. The terminal may periodically send, through the local application tool, the second request for information acquisition carrying the random number to the network apparatus. Whenever receiving the second request for information acquisition, the network apparatus checks whether it stores the first request for information acquisition corresponding to the random number carried in the second request for information acquisition. If yes, the network apparatus may directly send the corresponding first request for information acquisition. If not, the network apparatus may directly discard the second request for information acquisition.

In some embodiments, after performing Step S203, the network apparatus may directly send a response message carrying the random number and the first request for information acquisition to the terminal. The terminal may passively receive the response message sent by the network apparatus, which will not be described herein again.

S206: Receive local information corresponding to the received first request for information acquisition and acquired by the terminal through the local application tool.

That is, after the network apparatus sends the first request for information acquisition to the terminal through Step S205, the terminal may acquire the local information according to the first request for information acquisition through the local application tool. The terminal may send the local information to the network apparatus through the local application tool.

In the above two methods for acquiring local information according to the embodiments of the present application, the network apparatus may include a gateway and a server. Therefore, the step of generating the random number may be performed by the gateway. The establishment of the correspondence between the random number and the first request for information acquisition may be performed by the gateway or the server. The correspondence between the random number and the first request for information acquisition may be stored in the server and may be acquired by the local application tool of the terminal. Furthermore, the server may further include a service server and a secure channel server. The secure channel server may store the correspondence between the random number and the first request for information acquisition to ensure the security of the first request for information acquisition.

The process of logging in to the page of the payment application is described in detail below through an example that the network apparatus includes a gateway, a secure channel server, and a service server.

Figure 3:
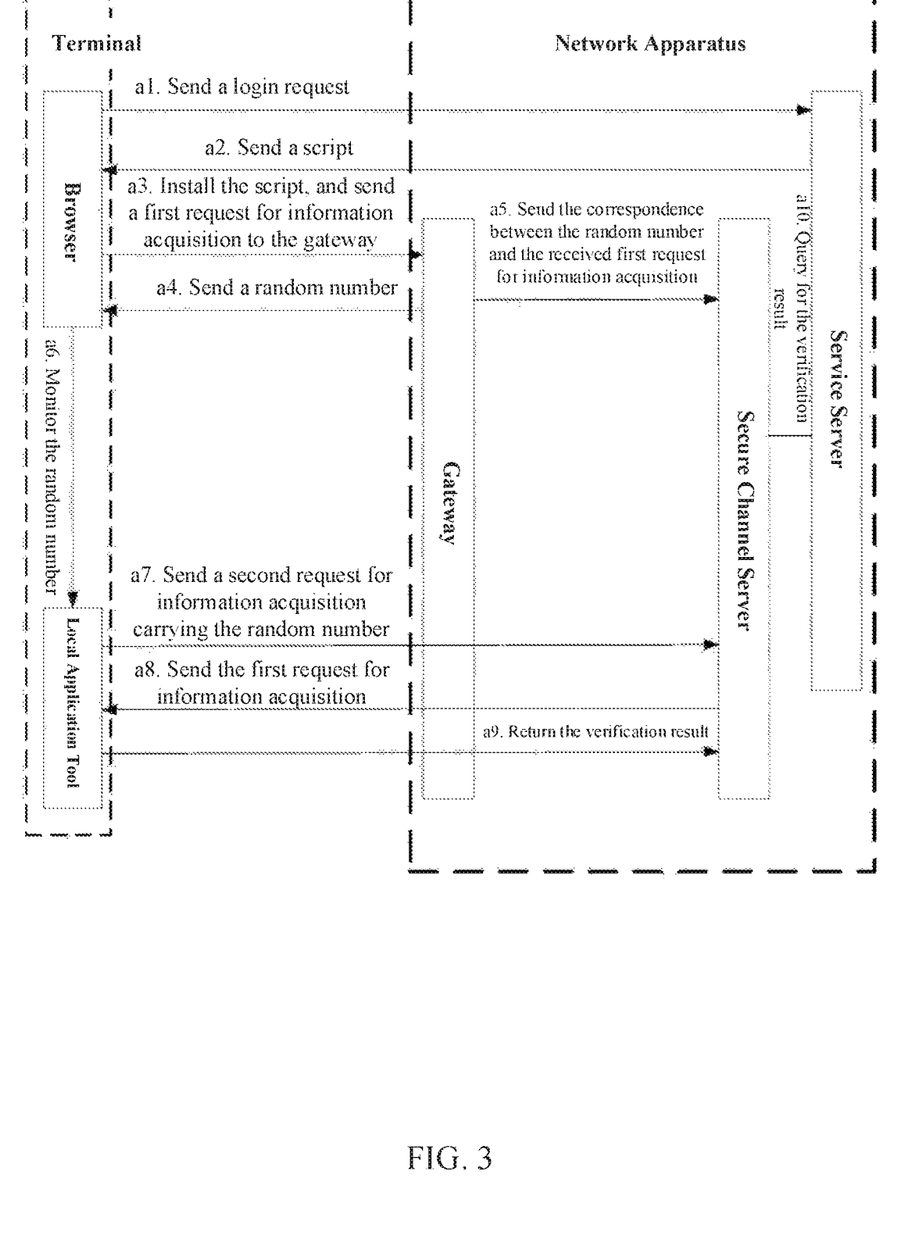
FIG. 3 is another schematic flow chart of an exemplary method for acquiring local information, according to an embodiment of the present application.

Referring to FIG. 3, the method for acquiring local information includes the following steps:

Step a1: A terminal sends a login request to a service server through a browser.

Step a2: The service server sends a script to the terminal. Specifically, the script may be a JS script.

Step a3: The terminal installs the received script in the browser, and sends a first request for information acquisition to the gateway through the script installed in the browser.

The terminal may generate and send the first request for information acquisition to the gateway by running the script installed in the browser.

Step a4: The gateway initiates secure connection to the terminal, and sends a random number generated in the secure connection process to the terminal.

Step a5: The gateway establishes the correspondence between the random number and the received first request for information acquisition, and transparently transmits the random number, the first request for information acquisition, and the correspondence to the secure channel server for storing.

Step a6: The terminal monitors, through the local application tool, the random number received by the terminal from the gateway.

Step a7: The terminal sends, through the local application tool, a second request for information acquisition carrying the random number monitored by the terminal to the secure channel server.

Step a8: The secure channel server queries for the first request for information acquisition corresponding to the random number carried in the second request for information acquisition, and sends the found first request for information acquisition to the terminal.

Step a9: The terminal verifies a local digital certificate through the local application tool according to the received first request for information acquisition, and sends the verification result to the secure channel server.

Step a10: The secure channel server stores the verification result for query by the service server.

After finding the verification result (that is, the local information) through query from the secure channel server, the service server may correspondingly process the login request sent by the terminal according to the verification result. In other words, if the verification result is that the verification is successful, the login request of the terminal is accepted. The terminal is allowed to log in to the interface of the payment application. If the verification result is that the verification fails, the login request of the terminal is rejected.

Figure 5:
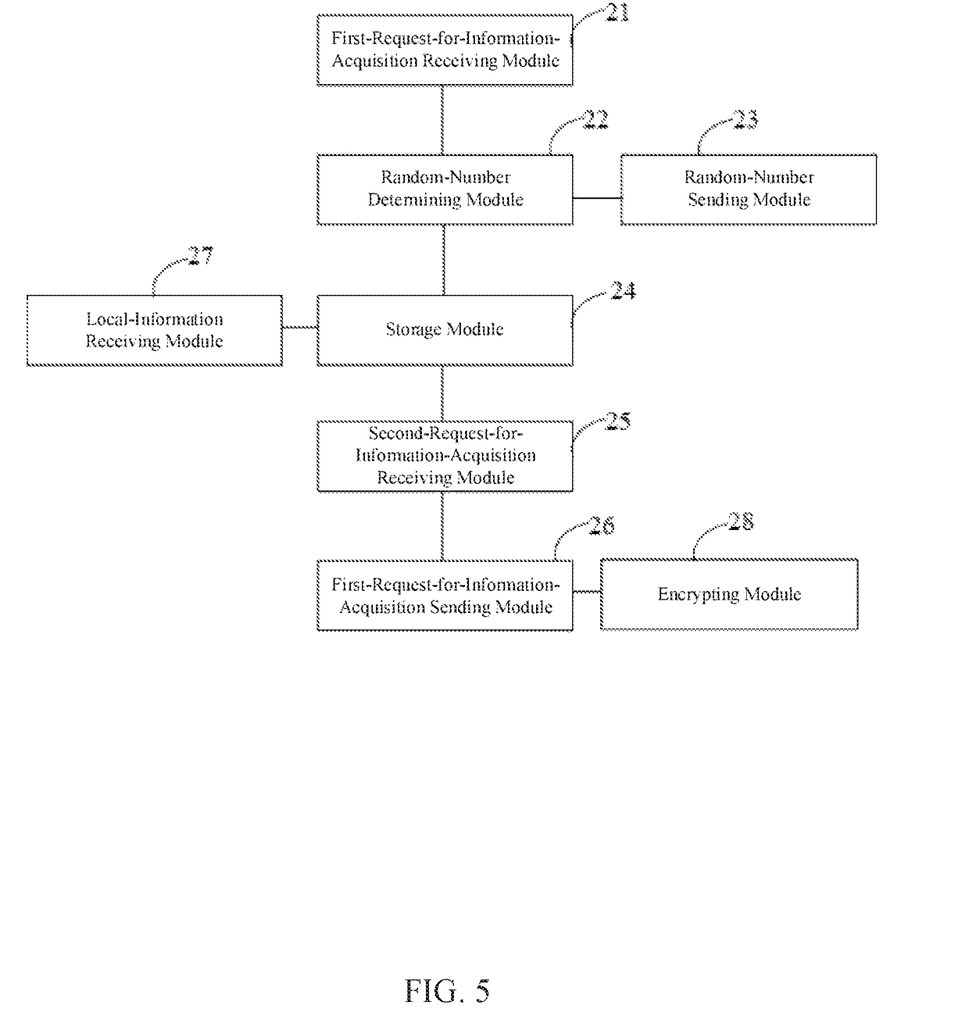
FIG. 5 is another schematic structural diagram of an exemplary apparatus for acquiring local information, according to an embodiment of the present application.
Figure 6:
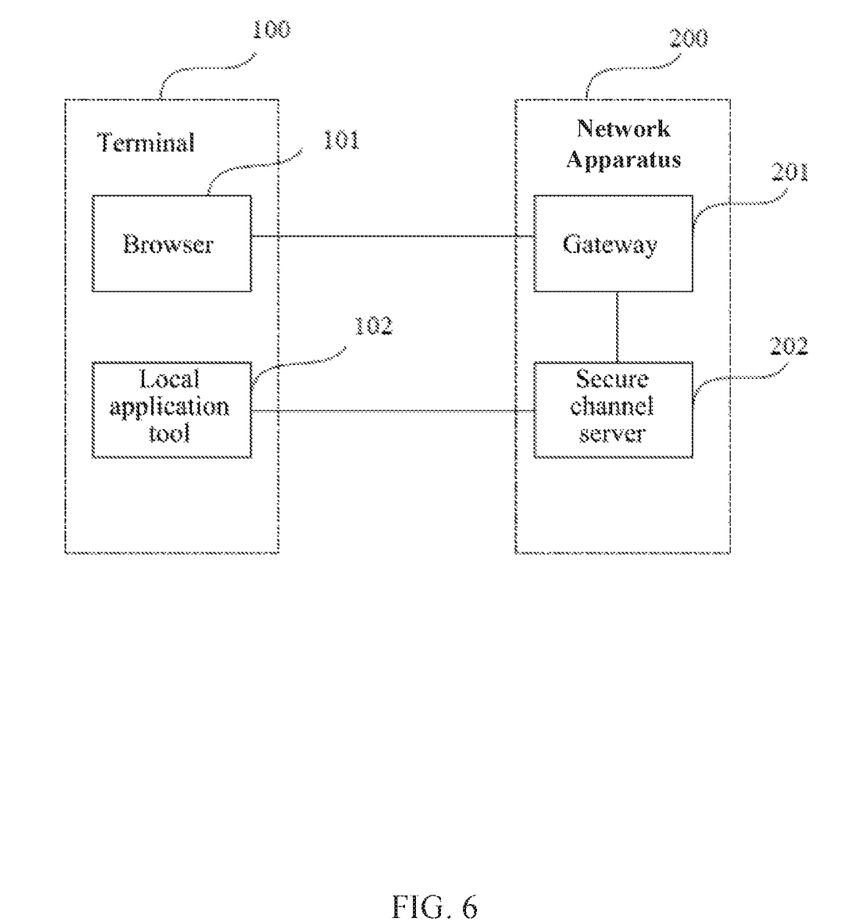
FIG. 6 is a schematic structural diagram of an exemplary system for acquiring local information, according to an embodiment of the present application.

The method for acquiring local information according to the embodiment of the present application is described above. Based on the same concept, the embodiments of the present application further provide an apparatus and a system for acquiring local information, as shown in FIGS. 4, 5, and 6.

Figure 4:
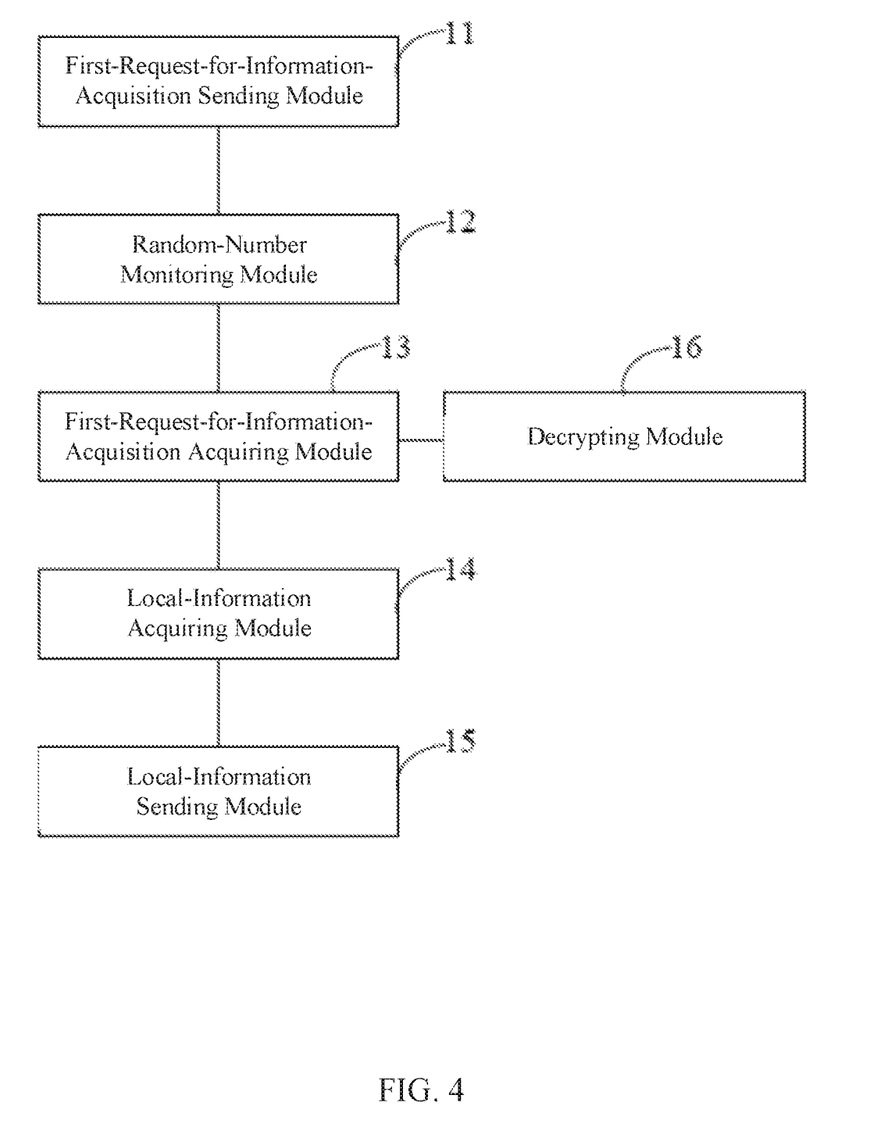
FIG. 4 is a schematic structural diagram of an exemplary apparatus for acquiring local information, according to an embodiment of the present application.

FIG. 4 is a schematic structural diagram of an exemplary apparatus for acquiring local information, according to an embodiment of the present application. The apparatus may include:

a first-request-for-information-acquisition sending module 11 sending a first request for information acquisition to a network apparatus through a script in a browser. The first request for information acquisition may be used for instructing a local application tool to acquire local information;

a random-number monitoring module 12 monitoring, through the local application tool, a random number corresponding to the first request for information acquisition sent by the network apparatus;

a first-request-for-information-acquisition acquiring module 13 acquiring, through the local application tool, the first request for information acquisition corresponding to the random number stored in the network apparatus. The correspondence between the random number and the first request for information acquisition may be established and stored by the network apparatus;

a local-information acquiring module 14 acquiring, through the local application tool, local information corresponding to the first request for information acquisition; and a local-information sending module 15 sending the local information to the network apparatus through the local application tool.

The random-number monitoring module 12, the first-request-for-information-acquisition acquiring module 13, the local-information acquiring module 14, and the local-information sending module 15 in the embodiment of the present application may be configured in the local application tool.

Furthermore, the first request for information acquisition acquired by the first-request-for-information-acquisition acquiring module 13 through the local application tool may be an encrypted first request for information acquisition. Therefore, the apparatus shown in FIG. 4 may further include: a decrypting module 16 decrypting the first request for information acquisition acquired by the first-request-for-information-acquisition acquiring module 13 before the local-information acquiring module 14 acquires, through the local application tool, the local information corresponding to the first request for information acquisition.

In the embodiment of the present application, the script may be, but not limited to, a JavaScript script.

FIG. 5 is another schematic structural diagram of an exemplary apparatus for acquiring local information, according to an embodiment of the present application. The apparatus may include:

a first-request-for-information-acquisition receiving module 21 receiving a first request for information acquisition sent by a terminal through a script in a browser, the first request for information acquisition being used for instructing a local application tool of the terminal to acquire local information;

a random-number determining module 22 determining a random number corresponding to the first request for information acquisition;

a random-number sending module 23 sending the random number to the terminal;

a storage module 24 storing the random number, determined by the random number determining module 22, corresponding to the first request for information acquisition In other words, the storage module 24 may store the first request for information acquisition, the random number, and the correspondence between the first request for information acquisition and the random number.

a second-request-for-information-acquisition receiving module 25 receiving a second request for information acquisition sent by the terminal through the local application tool;

a first-request-for-information-acquisition sending module 26 sending, to the terminal, the first request for information acquisition corresponding to the random number carried in the second request for information acquisition; and a local-information receiving module 27 receiving local information, acquired by the terminal through the local application tool, corresponding to the received first request for information acquisition.

The storage module 24 may be further configured to store the local information received by the local-information receiving module 27.

The second-request-for-information-acquisition receiving module 25, the first-request-for-information-acquisition sending module 26, and the local-information receiving module 27 may be configured in a secure channel server.

Corresponding to the decrypting module 16 in the apparatus shown in FIG. 4, the apparatus shown in FIG. 5 may further include: an encrypting module 28 encrypting the first request for information acquisition corresponding to the random number carried in the second request for information acquisition before the first-request-for-information-acquisition sending module 26 sends, to the terminal, the first request for information acquisition corresponding to the random number carried in the second request for information acquisition.

FIG. 6 is a schematic structural diagram of an exemplary system for acquiring local information, according to an embodiment of the present application. The system may include a terminal 100 and a network apparatus 200.

Terminal 100 may be configured to send a first request for information acquisition to network apparatus 200 through a script in a browser 101. The first request for information acquisition may be used for instructing a local application tool 102 to acquire local information. Terminal 100 may also be configured to monitor, through local application tool 102, a random number, sent by network apparatus 200, corresponding to the first request for information acquisition. Terminal 100 may further be configured to acquire, through local application tool 102, the first request for information acquisition corresponding to the random number stored in network apparatus 200. In addition, terminal 100 may be configured to acquire, through local application tool 102, local information corresponding to the first request for information acquisition. Moreover, terminal 100 may be configured to send, through local application tool 102, the local information to network apparatus 200.

Network apparatus 200 may be configured to receive the first request for information acquisition, generate the random number, and send the random number to the terminal, where the process may be executed through a gateway 201 in network apparatus 200.

Network apparatus 200 may also be configured to establish and store the correspondence between the random number and the first request for information acquisition. Network apparatus 200 may further be configured to receive a second request for information acquisition sent by terminal 100 through local application tool 102. In addition, network apparatus 200 may be configured to send, to terminal 100, the first request for information acquisition corresponding to the random number carried in the second request for information acquisition. Moreover, network apparatus 200 may be configured to receive the local information sent by terminal 100. The process may be executed through a secure channel server 202 connected to gateway 201.

In view of the above, in the embodiments of the present application, taking information security into consideration, a browser of a terminal may not directly acquire local information of the terminal where the browser is located. If the browser directly invokes a plug-in to acquire the local information, the browser and the plug-in are required to have high compatibility. Therefore, on the premise that the browser does not directly acquire the local information, in the present application, a terminal may send an acquisition request for acquiring local information to a network apparatus, through a script in the browser. The terminal may also acquire the acquisition request from the network apparatus through a local application tool. The terminal may further acquire corresponding local information according to the acquisition request. In addition, the terminal may provide the local information to the network apparatus. In this way, the browser does not have to directly acquire the local information, which ensures information security. In addition, the browser does not have to directly interact with the local application tool and thus has no need to be compatible with the local application tool, which effectively avoids the problem of browser instability caused by incompatibility between the browser and the plug-in and effectively reduces the difficulty in website maintenance.

It should be further noted that the terms "include," "contain," or any other variations are intended to cover non-exclusive inclusions. These terms cause processes, methods, commodities, or apparatuses including a series of elements, but limited to those elements. They may also include other elements that are not listed specifically, or also include elements that are inherent in these processes, methods, commodities, or apparatuses. Therefore, the element defined by a sentence "including a . . . " does not preclude the presence of other identical elements in the process, method, commodity, or apparatus.

Persons skilled in the art will understand that the embodiments of the present application might be embodied as a method, a system, or a computer program product. Accordingly, the present application may take the form of an entire hardware embodiment, an entire software embodiment or an embodiment combining software and hardware. Furthermore, the present application may take the form of a computer program product implemented in one or more computer-usable storage media (including but not limited to a magnetic disk memory, a CD-ROM, and an optical memory) containing computer usable program codes.

The above descriptions are merely embodiments of the present application, and not intended to limit the present application. Persons skilled in the art can make various changes and modifications to the present application. Any modification, equivalent replacement, or improvement made without departing from the spirit and principle of the present application shall fall within the scope of the present application.

What is claimed is:

1. A method for acquiring local information in a terminal, the method comprising:
    sending, by a browser of the terminal, a first request for information acquisition to a network apparatus through a script in the browser;
    receiving, through the browser, a random number corresponding to the first request for information acquisition from the network apparatus;
    monitoring, through a local application tool of the terminal, the random number, wherein the local application tool is executed without having direct interaction with the browser;
    sending, through the local application tool without interacting with the browser, a second request for information acquisition carrying the monitored random number to the network apparatus;
    receiving from the network apparatus, by the terminal through the local application tool without interacting with the browser, the first request for information acquisition corresponding to the random number carried in the second request for information acquisition, the correspondence between the random number and the first request for information acquisition being established and stored by the network apparatus;
    acquiring, through the local application tool, local information of the terminal corresponding to the first request for information acquisition, wherein, in response to the receiving the first request for information acquisition, the local application tool is instructed to acquire the local information and wherein the local information is a verification result acquired by verifying a local digital certificate of the terminal through the local application tool; and
    sending, through the local application tool without interacting with the browser, the local information to the network apparatus.

2. The method of claim 1,
    wherein the first request for information acquisition acquired through the local application tool is an encrypted first request for information acquisition, and wherein the method further comprises:
decrypting the first request for information acquisition through the local application tool before acquiring, through the local application tool, the local information corresponding to the first request for information acquisition.

3. The method of claim 1, wherein the script includes a JavaScript script.

4. A method for acquiring local information from a remote terminal, the method comprising:
receiving a first request for information acquisition sent by a browser of the terminal through a script in the browser;
determining and storing a random number corresponding to the first request for information acquisition;
sending the random number to the terminal;
receiving a second request for information acquisition carrying the random number sent by the terminal through a local application tool without interacting with the browser, wherein the local application tool is executed without having direct interaction with the browser;
sending, to the local application tool of the terminal without interacting with the browser, the first request for information acquisition corresponding to the random number carried in the second request for information acquisition, wherein, in response to the first request for information acquisition being received by the local application tool, the local application tool is instructed to acquire local information of the terminal and wherein the local information is a verification result acquired by verifying a local digital certificate of the terminal through the local application tool; and
receiving the local information corresponding to the received first request for information acquisition and acquired by the terminal through the local application tool without interacting with the browser.

5. The method of claim 4, further comprising:
encrypting the first request for information acquisition corresponding to the random number carried in the second request for information acquisition before sending, to the terminal, the first request for information acquisition corresponding to the random number carried in the second request for information acquisition.

6. An apparatus for acquiring local information, the apparatus comprising:
a memory storing a set of instructions; and
one or more processors configured to execute the set of instructions to cause the apparatus to perform:
sending, by a browser of a terminal, a first request for information acquisition to a network apparatus through a script in the browser;
receiving, through the browser, a random number corresponding to the first request for information acquisition from the network apparatus;
monitoring, through a local application tool of the terminal, the random number, wherein the local application tool is executed without having direct interaction with the browser;
sending, through the local application tool without interacting with the browser, a second request for information acquisition carrying the monitored random number to the network apparatus;
receiving from the network apparatus, through the local application tool without interacting with the browser, the first request for information acquisition corresponding to the random number carried in the second request for information acquisition, the correspondence between the random number and the first request for information acquisition being established and stored by the network apparatus;
acquiring, through the local application tool, local information of the terminal corresponding to the first request for information acquisition, wherein, in response to the receiving the first request for information acquisition, the local application tool is instructed to acquire the local information and wherein the local information is a verification result acquired by verifying a local digital certificate of the terminal through the local application tool; and
sending the local information to the network apparatus through the local application tool without interacting with the browser.

7. The apparatus of claim 6,
wherein the first request for information acquisition acquired through the local application tool is an encrypted first request for information acquisition, and
wherein the one or more processors are configured to execute the set of instructions to cause the apparatus to further perform:
decrypting the first request for information acquisition before acquiring, through the local application tool, the local information corresponding to the first request for information acquisition.

8. The apparatus of claim 6, wherein the script includes a JavaScript script.

9. An apparatus for acquiring local information from a remote terminal, the apparatus comprising:
a memory storing a set of instructions; and
one or more processors configured to execute the set of instructions to cause the apparatus to perform:
receiving a first request for information acquisition sent by a browser of the terminal through a script in the browser;
determining a random number corresponding to the first request for information acquisition;
sending the random number to the terminal;
storing the random number corresponding to the first request for information acquisition;
receiving a second request for information acquisition carrying the random number sent by the terminal through a local application tool without interacting with the browser, wherein the local application tool is executed without having direct interaction with the browser;
sending, to the local application tool of the terminal without interacting with the browser, the first request for information acquisition corresponding to the random number carried in the second request for information acquisition, wherein, in response to the first request for information acquisition being received by the local application tool, the local application tool is instructed to acquire local information of the terminal and wherein the local information is a verification result acquired by verifying a local digital certificate of the terminal through the local application tool; and
receiving the local information, acquired by the terminal through the local application tool, corresponding to the received first request for information acquisition without interacting with the browser.

10. The apparatus of claim 9, wherein the one or more processors are configured to execute the set of instructions to cause the apparatus to further perform:

encrypting the first request for information acquisition corresponding to the random number carried in the second request for information acquisition before sending, to the terminal, the first request for information acquisition corresponding to the random number carried in the second request for information acquisition.

11. A non-transitory computer readable medium that stores a set of instructions that when executed by at least one processor of an apparatus causes the apparatus to perform a method for storing data, the method comprising:
   sending, by a browser of a terminal, a first request for information acquisition to a network apparatus through a script in the browser;
   receiving, through the browser, a random number corresponding to the first request for information acquisition from the network apparatus;
   monitoring, through a local application tool of the terminal, the random number, wherein the local application tool is executed without having direct interaction with the browser;
   sending, through the local application tool without interacting with the browser, a second request for information acquisition carrying the monitored random number to the network apparatus;
   receiving from the network apparatus, through the local application tool without interacting with the browser, the first request for information acquisition corresponding to the random number carried in the second request for information acquisition, the correspondence between the random number and the first request for information acquisition being established and stored by the network apparatus;
   acquiring, through the local application tool, local information of the terminal corresponding to the first request for information acquisition, wherein, in response to the receiving the first request for information acquisition, the local application tool is instructed to acquire the local information and wherein the local information is a verification result acquired by verifying a local digital certificate of the terminal through the local application tool; and
   sending, through the local application tool without interacting with the browser, the local information to the network apparatus.

12. The non-transitory computer readable medium of 11, wherein the first request for information acquisition acquired through the local application tool is an encrypted first request for information acquisition, and wherein the method further comprises:
   decrypting the first request for information acquisition through the local application tool before acquiring, through the local application tool, the local information corresponding to the first request for information acquisition.

13. The non-transitory computer readable medium of 11, wherein the script includes a JavaScript script.

14. A non-transitory computer readable medium that stores a set of instructions that when executed by at least one processor of an apparatus causes the apparatus to perform a method for storing data, the method comprising:
   receiving a first request for information acquisition sent by a browser of a remote terminal through a script in the browser;
   determining and storing a random number corresponding to the first request for information acquisition;
   sending the random number to the terminal;
   receiving a second request for information acquisition carrying the random number sent by the terminal through a local application tool without interacting with the browser, wherein the local application tool is executed without having direct interaction with the browser;
   sending, to the local application tool of the terminal without interacting with the browser, the first request for information acquisition corresponding to the random number carried in the second request for information acquisition, wherein, in response to the first request for information acquisition being received by the local application tool, the local application tool is instructed to acquire local information of the terminal and wherein the local information is a verification result acquired by verifying a local digital certificate of the terminal through the local application tool; and
   receiving the local information corresponding to the received first request for information acquisition and acquired by the terminal through the local application tool without interacting with the browser.

15. The non-transitory computer readable medium of 14, the method further comprising:
   encrypting the first request for information acquisition corresponding to the random number carried in the second request for information acquisition before sending, to the terminal, the first request for information acquisition corresponding to the random number carried in the second request for information acquisition.

* * * * *